United States Patent Office 3,317,443
Patented May 2, 1967

3,317,443
SOLVENTLESS RESIN PREPARATION OF SILICONE-EPOXY RESINS
Sam A. Brady, Midland, Mich., assignor to Dow Corning Corporation, Midland, Mich., a corporation of Michigan
No Drawing. Filed Feb. 21, 1963, Ser. No. 260,316
6 Claims. (Cl. 260—18)

This invention relates to a method of preparing certain silicone-epoxy resins in the absence of a solvent.

Epoxide resins are employed in many places where a tough hard coating is desired. The use of epoxides in the paint and varnish industry has been somewhat circumscribed by the tendency of the epoxide to chalk and/or craze when exposed to the ravages of weathering. It has been found that the inclusion of siloxane resins with epoxide resins has marketably improved the weatherability of coatings made from such co-resins. These useful materials are actually co-resins; that is, the two components are actually chemically combined, rather than being mere mixtures of two kinds of resins. In fact, most epoxide resins are incompatible with most siloxane resins. Thus, it is necessary to obtain reaction of the two materials in order to have a useful product.

Silicone-epoxy resins are made from a variety of silicone compositions, normally by mixing the silicone and epoxide and heating to effect unification to the co-resin. This is usually done in an organic liquid that is a solvent for both the silicone and epoxide components. In certain instances it may be possible to produce the co-resin without the aid of a solvent. However, when employing silicones that are largely phenylsiloxanes, a solvent has been found to be imperative. In all past efforts to prepare phenylsiloxane-epoxide co-resins without the aid of a solvent the result has been either a two-phase mixture (i.e. no determinable co-resination) or gelation of the mass. Neither condition is desirable and neither is a useable product.

It is an object of the present invention to prepare a compatible co-resin comprising a phenylsiloxane an an organic epoxide. This and other objects will be apparent from the following description.

This invention relates to a method comprising reacting (1) from 50 to 90 parts by weight of a fatty acid modified condensation product of (a) an epihalohydrin in which the halogen atom has an atomic weight between 35 and 80, and (b) a dihydric phenol, with (2) from 10 to 50 parts by weight of a hydroxyl-containing organosilicon compound of the unit formula $(C_6H_5)_xR_ySiO_{4-x-y/2}$ wherein R is a monovalent hydrocarbon radical, $x$ has an average value of from 0.65 to 1.3, $y$ has an average value of less than 0.4, the sum of $x+y$ is from 0.95 to 1.3 inclusive, at least 60 mol percent of said siloxane being $(C_6H_5)SiO_{1.5}$ units, there being a total of 100 parts of (1) plus (2), in the presence of (3) from 2 to 8 parts per 100 parts of [(1)+(2)] of a polyhydric alcohol, in the absence of a solvent to given a soluble compatible resin.

The above reaction is normally carried out at elevated temperatures to hasten the reaction. For fastest reaction the acid-modified epoxide, silicone resin and polyhydric alcohol are mixed and heated to reflux with agitation until the mixture becomes one-phase. Often, the epoxide and acid-modifier are added together so that acid modification and co-resination occur simultaneously. This latter is the simpler method and is preferred.

The epoxide component of this invention is the reaction product of an epihalohydrin and a dihydric phenol. The term "dihydric phenol" is used herein to include (a) mononuclear dihydric phenols, i.e. dihydroxybenzene (e.g. pyrocatechol resorcinol and hydroquinone); (b) polynuclear dihydric phenols such as dihydroxydiphenyls (e.g., 4,4'-dihydroxydiphenyl), dihydroxynaphthylenes and dihydroxyanthracenes; (c) the condensation product of monohydric phenols with saturated aliphatic, aryl aliphatic, aryl, and cyclic ketones and aldehydes; and (d) dihydric phenols as described in (a), (b), and (c) in which one or more nuclei are alkyl or halo-substituted in any of the available positions, the alkyl side chains including lower alkyl groups such as methyl, ethyl, propyl, butyl and hexyl, and the halo radicals including chloro- and fluoro.

The epihalohydrin can be epichlorohydrin or epibromohydrin. In addition, the epihalohydrin taking part in the reaction may be provided by adding a substance which, under the conditions used for the reaction, yields an epihalohydrin. Illustrative of this last is alpha-gamma-glycerol dichlorohydrin $$\underset{\text{OH}}{(\text{ClCH}_2\overset{|}{\text{CHCH}_2\text{Cl}})}$$

which reacts in a 1:1 molar ratio with a strong base to produce epichlorohydrin. Epichlorohydrin, or a reagent such as the above that produces epichlorohydrin, is the preferred epihalohydrin.

The reaction between the dihydric phenol and epihalohydrin is carried out in the presence of caustic alkali equal to or somewhat in excess of an amount required to combine with all of the halogen of the halohydrin. The reaction can be carried out at room temperature at the start, if desired. Since the reaction is exothermic, the temperature will rise as the reaction proceeds, but may require added heating toward the end to complete the reaction. Ordinarily, temperatures of 80° C. to 110° C. are employed when desired.

The aqueous alkali, dihydric phenol and epihalohydrin may be mixed together initially; or the aqueous alkali and dihydric phenol may be admixed and the epihalohydrin added thereto; or the aqueous solution of alkali and dihydric phenol may be added to the epihalohydrin. In any event, the reaction proceeds upon mixing, with the above-mentioned exotherm.

The reaction time may vary from less than 30 minutes to more than 3 hours. As the resin forms, it separates from the aqueous phase. The resin is then washed free of alkali salts and excess alkali hydroxide and dried by heating. While an organic solvent can be used in place of the water in the above reaction, the said organic solvent being inert to reactants and products, water is preferred. In the case where the resin is soluble or partially soluble in hot water, an organic solvent may be used advantageously.

The specific reaction by which an epihalohydrin condensation polymer is produced takes place by addition of hydrogen to an epoxy group i.e. the group

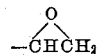

a secondary alcohol being formed as a product of this reaction which is believed to occur between the epoxy group of a epihalohydrin and a hydrogen atom derived from a dihydric phenol. In equation (1) below, the formula HA in this equation represents the hydrogen atom, H being the hydrogen atom of one hydroxyl portion of a dihydric phenol, and A being the residue of the said dihydric phenol. The reaction proceeds as shown:

(1) 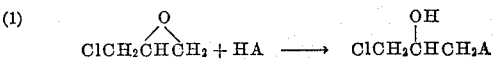

It has been found that the product of a reaction corresponding to equation (1), when treated with a strong base, such as solium or potassium hydroxide, yields a compound containing an epoxy group. This reaction is believed to proceed according to the following equation:

(2)

The epoxy compound produced by a reaction according to equation (2) can then be reacted with a substance havinng the formula HA' (A' herein is used as A above, except to denote that the residue can be different); it is believed that the epoxy group undergoes a reaction similar to that represented in equation (1) to produce a compound having a general formula as follows:

(3)
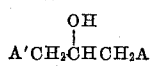

Thus, by calculating the proportions of the reactants, complex reaction products of predetermined hydroxyl content and molecular weight can be obtained. It is preferable, but not necessary, that the molar ratio of epihalohydrin to dihydric phenol be within the range from 1.1:1 to 1.4:1 and it is most desirable that the molar ratio of epihalohydrin to dihydricphenol be about 1.25:1. Variation of this ratio within the limitation stated will yield epoxy resins of varying molecular weights and hydroxyl content as desired. It is preferred that an excess of alkali over that necessary to react with the epihalohydrin be employed, in an amount of 10 to 30 percent.

The preferred epihalohydrin condensation polymers (epoxide resins) for use in the practice of this invention are the condensation products of epichlorohydrin with bisphenol. Various grades of such resins (i.e. resins of varying molecular weight, equivalent weight and solubility) are commercially available under a number of trade names.

The ephihalohydrin condensation polymers for use in the practice of this invention are modified with fatty acids. Such modification improves the solubility characteristics of the polymers.

Suitable fatty acids which may be used to modify epoxide resins can be any saturated or unsaturated fatty acid having from 2 to 18 cabon atoms therein. Such acids include, for example, fatty acids in the series from acetic to stearic, and acrylic, crotonic, isocrotonic, vinylacetic, methylacrylic, tiglic, angelic, sorbic, hydrosorbic, 4-methylene-2-nonenoic, 4-tetradecenoic, alpha-methylenebutyric, alpha-ethylidenecaproic, tetrolic, 2,8-decadiene-4,6-diynoic tetracrylic, oleic, pentinoic, palmitolic, linolenic and ricinoleic acids. Many fatty acids are also available commercially which are derived from glycerol esters. These are also useable.

The fatty acid modification of an epoxide resin may be conducted by heating the mixture of the fatty acid and the resin polymer in the desired proportions at an elevated temperature, preferably above about 150° C., to obtain a product having an acid number preferably below 12. The time required to do this is usually on the order of 2 to 8 hours, varying, of course, with the temperature. It is desirable to conduct this heating in an inert atmosphere (e.g. of nitrogen or carbon dioxide), and the inert gas can conveniently be bubbled through the reaction mixture to affect stirring. At the higher operating temperatures it is imperative that an inert atmosphere be used, to prevent oxidation of the product and reactants.

Organosilicon compound (2) is a phenyl-containing polysiloxane of the formula given above. Radical R' can be any radical as defined, such as alkyl such as methyl, ethyl, butyl and octadecyl; unsaturated aliphatic such as vinyl, allyl, methallyl and butadienyl; cycloaliphatic such as cyclobutyl, cyclopentenyl and cyclohexadienyl; alkaryl groups such as tolyl; aryl groups such as xenyl; and aralkyl groups such as benzyl and xylyl. Siloxane (2) can thus contain only phenyl substitutents in which case $x$ has a value of from 0.8 to 1.3, or this siloxane can contain phenyl substituents plus other monovalent hydrocarbon radicals. The latter are present in less than 0.4 such radicals per silicon atom. At least 60 mol percent of the phenylsiloxane are $C_6H_5SiO_{1.5}$ units, while the remainder can be $SiO_2$ units and such units as $R'SiO_{1.5}$, $R'_2SiO$ and $(C_6H_5)R'SiO$. In all cases, the ratio of organic groups to silicon in this siloxane must fall within the above range.

When the R' radicals are present in siloxane (2), it is preferred that they be methyl, ethyl, vinyl, allyl or xenyl, as these substituents do not grossly affect the thermal stability of the said siloxane or the resinous product of this invention.

There should be at least one, and preferably at least two hydroxyl radicals per molecule of siloxane (2). Without these reactive radicals, the siloxane component cannot react with the modified epoxide. Thus, the interaction between resin (1) and siloxane (2) occurs through the said hydroxyl sites on the siloxane.

Polyhydric alcohol (3) is an essential part of the present method. When this component is omitted, the process fails by either failure of the two components to unify (become one phase) or because the mixture gels, or both. The polyhydric alcohol appears to modify or moderate the reaction so that a soluble (non-gelled) compatible resin is obtained. Any polyhydric alcohol can be employed. By "polyhydric alcohol" is meant an aliphatic organic compound containing three or more hydroxyl radicals therein. Examples of polyhydric alcohols suitable for the method of this invention include glycerol, pentaerythritol, 1,2,6 - hexanetriol, trimethylolpropane, erythritol, xylitol, mannitol, etc. Glycerol is preferred.

There should be at least two parts of the said polyhydric alcohol present in the reaction mixture. When less than two parts are employed, the desired compatibilization will not occur, or else the resin will gel. More than eight parts of polyhydric alcohol is not desirable in that its diluting affect becomes apparent, with the result that the finished resin is softer in its end use, often being too soft for the said desired use. The polyhydric alcohol is quite effective in accomplishing the desired results, namely, that of producing a compatible soluble resin in the absence of a solvent, when employed in the above cited range of concentration.

As stated earlier, the reaction is normally carried out at elevated temperatures, most suitably at temperatures above 150° C. Ordinarily, the reaction is conducted under an inert atmosphere (conventionally nitrogen or carbon dioxide) when the higher temperatures are to be encountered. When the epoxy resin is first acid-modified and then reacted with the siloxane, the mixture is heated until a compatible system is obtained. When the acid modification and co-resination steps are combined into one single operation, the mixture is heated to the end point that compatibility and a desired acid number have both been obtained. The acid number is a measure of the extent of reaction of the fatty acid, and is the number of milligrams of potassium hydroxide required to neutralize one gram of material containing the acid. This is a standard test. It is obvious that as the acid modification proceeds, the residual acid concentration decreases, and the acid number with it.

The process of this invention produces epoxide-siloxane co-resins suitable for paint and varnish vehicles which would be so employed whenever superior weathering, i.e. chalking and/or crazing resistance is desired. The present method is especially useful in that the need for a solvent during the preparation of the silicone-epoxide resin is eliminated. It is desirable to eliminate solvent in this step because of volume efficiency of processing the co-resin (i.e. more resin can be made per unit of volume of equipment) and in speed of manufacture. This is particularly desirable in that special equipment is not required for preparing a co-resin by the present method. Thus, equipment cost is substantially reduced.

The following examples are illustrative only and should not be construed as limiting the invention which is properly delineated in the appended claims.

Example 1

A mixture of 28.3 g. of a polysiloxane containing 70 mol percent of phenylsiloxane units and 30 mol percent of propylsiloxane units, 28.3 g. of an epoxy resin which is the condensation product of epichlorohydrin and bis-phenol [$(HOC_6H_4)_2(CH_3)_2$], having an average molecular weight in the range of 1600 to 2000, 37.8 g. of the mixture of acids obtained from the saponification of linseed oil, and 4.7 g. of glycerol was placed in a reactor equipped with a stirring device and means for providing an inert atmosphere. An atmosphere of dry nitrogen was provided, and the mixture was then heated to 220° C. with stirring and held at those conditions until the acid number of the mixture had dropped to the range of 10 to 12. During this time the mixture compatibilized. The resin was then cooled. A compatible soluble resin was obtained. A 50 percent solution of this resin in a mixture of equal weight parts of toluene and butanol had the following properties:

Specific gravity _____ 0.954
Viscosity _____cs__ 350
Acid number _____ 12

A film of this resin laid down on an aluminum panel was found to cure in 5 to 16 hours at 100° C. or in 1 to 3 hours at 150° C., both uncatalyzed.

Example 2

Equivalent results are obtained when the epoxy resin and fatty acid of Example 1 are first reacted and thereafter the reaction product caused to react with the polysiloxane and glycerol of that example.

Example 3

Equivalent results are obtained when the following amounts of the following polyhydric alcohols are substituted for the glycerol of Example 1:

(A) 2 g. of mannitol
(B) 7.8 g. of trimethylolpropane
(C) 4 g. of erythritol
(D) 5.2 g. of pentaerythritol.

Example 4

Equivalent results are obtained when any of the following fatty acids are substituted for the acid of Example 1: propionic acid, palmitolic acid, tetrolic acid, sorbic acid, 4-tetradecenoic acid, pentinoic acid, and the acid derived from the saponification of mustard seed oil.

Example 5

Equivalent results are obtained when any of the following polysiloxanes are used in place of the siloxane of Example 1:

(A) Monophenylpolysiloxane.
(B) A copolymer containing 65 mol percent of phenylsiloxane units, 20 mol percent of $SiO_2$ units and 15 mol percent of hexylethylsiloxane units.
(C) A copolymer containing 95 mol percent monophenylsiloxane units and 5 mol percent diphenylsiloxane units.
(D) A copolymer containing 65 mol percent phenylsiloxane units, 30 mol percent methylsiloxane units and 5 mol percent $SiO_2$ units.
(E) A copolymer containing 70 mol percent phenylsiloxane units, 20 mol percent xylyloctylsiloxane units and 10 mol percent vinylcyclohexylsiloxane units.

Example 6

Equivalent results are obtained when the epoxy resin of Example 1 is replaced by one made from any of the following dihydric phenols: resorcinol, 4,4'-dihydroxydiphenyl, dihydroxydianthracene, 4-hydroxyphenyl-2,2-hydroxyphenyldimethylmethane, bis(hydroxyphenyl)diethylmethane, bis(hydroxydichlorophenyl)dimethylmethane, and bis(hydroxyphenyl)butylphenylmethane.

Example 7

When 10 g. of monophenylpolysiloxane, 35.9 g. of the epoxide resin of Example 1, 48.0 g. of stearic acid and 6.1 g. of 1,2,6-hexanetriol are mixed and reacted at 150° C. under carbon dioxide for several hours, a compatible soluble resin is obtained.

That which is claimed is:

1. A method comprising reacting
   (1) from 50 to 90 parts by weight of a fatty acid modified condensation product of
      (a) an epihalohydrin in which the halogen atom has an atomic weight between 35 and 80, and
      (b) a dihydric phenol, with
   (2) from 10 to 50 parts by weight of a hydroxyl-containing organosilicon compound of the unit formula $$(C_6H_5)_xR_ySiO_{4-x-y/2}$$

wherein
   R is a monovalent hydrocarbon radical,
   x has an average value of from 0.65 to 1.3,
   y has an average value of less than 0.4, the sum of $x+y$ is from 0.95 to 1.3 inclusive, at least 60 mol percent of said siloxane being $$(C_6H_5)SiO_{1.5}$$

units, there being a total of 100 parts of (1) plus (2), in the presence of
   (3) from 2 to 8 parts per 100 parts of [(1)+(2)] of an aliphatic polyhydric alcohol containing at least three hydroxyl radicals,
in the absence of a solvent to give a soluble compatible resin.

2. A method comprising reacting at an elevated temperature
   (1) from 50 to 90 parts of a fatty acid modified condensation product of
      (a) an epihalohydrin in which the halogen atom has an atomic weight of between 35 and 80, and
      (b) a dihydric phenol, with
   (2) from 10 to 50 parts by weight of a hydroxyl-containing organosilicon compound of the unit formula $$(C_6H_5)_xR_ySiO_{4-x-y/2}$$

wherein
   R is a monovalent hydrocarbon radical,
   x has an average value of from 0.65 to 1.3,
   y has an average value of less than 0.4, the sum of $x+y$ is from 0.95 to 1.3 inclusive, at least 60 mol percent of said siloxane being $$(C_6H_5)SiO_{1.5}$$

units, there being a total of 100 parts of (1) plus (2), in the presence of
   (3) from 2 to 8 parts per 100 parts of [(1)+(2)] of an aliphatic polyhydric alcohol containing at least three hydroxyl radicals,
in the absence of a solvent to give a soluble compatible resin.

3. The method of claim 1 wherein component (1)(a) is epichlorohydrin, component (1)(b) is bis-phenol, in component (2) R is alkyl, and component (3) is glycerol.

4. The method of claim 2 wherein component (1)(a) is epichlorohydrin, component (1)(b) is bis-phenol, in component (2) R is alkyl, and component (3) is glycerol.

5. The method of claim 1 wherein component (1)(a) is epichlorohydrin, component (1)(b) is bis-phenol, component (2) is a monophenylpolysiloxane and component (3) is glycerol.

6. The method of claim 2 wherein component (1)(a) is epichlorohydrin, component (1)(b) is bis-phenol, component (2) is a monophenylpolysiloxane and component (3) is glycerol.

References Cited by the Examiner

UNITED STATES PATENTS

| | | | |
|---|---|---|---|
| 2,687,398 | 8/1954 | McLean | 260—18 |
| 2,695,276 | 11/1954 | Hatcher | 260—18 |
| 2,718,507 | 9/1955 | Rauner | 260—46.5 |
| 2,768,150 | 10/1956 | Miller et al. | 260—824 |
| 2,843,560 | 7/1958 | Mika | 260—18 |
| 2,967,171 | 1/1961 | Barnes et al. | 260—824 |
| 3,038,875 | 6/1962 | Boyer et al. | 260—824 |
| 3,055,858 | 9/1962 | Frye et al. | 260—18 |

DONALD E. CZAJA, *Primary Examiner.*

LEON J. BERCOVITZ, *Examiner.*

R. W. GRIFFIN, *Assistant Examiner.*

UNITED STATES PATENT OFFICE
CERTIFICATE OF CORRECTION

Patent No. 3,317,443            Dated: May 2, 1967

SAM A. BRADY

It is certified that errors appear in the above identified patent and that said Letters Patent are hereby corrected as shown below:

Col. 1, line 58 - "to given a" should read "to give a".

Col. 3, line 49 - before "linolenic" insert -- linoleic --.

Col. 5, line 9 - the formula "$[(HOC_6H_4)_2(CH_3)_2]$" should read "$[(HOC_6H_4)_2C(CH_3)_2]$".

Col. 5, line 25 - "Viscosity - - - cs 350" should read "Viscosity - - - cs 305".

Signed and sealed this 11th day of April 1972.

(SEAL)
Attest:

EDWARD M. FLETCHER, JR.            ROBERT GOTTSCHALK
Attesting Officer                    Commissioner of Patents